United States Patent
Aubauer et al.

(10) Patent No.: US 9,921,690 B2
(45) Date of Patent: Mar. 20, 2018

(54) SYSTEM AND METHOD FOR CONTACTLESS DETECTION AND RECOGNITION OF GESTURES IN A THREE-DIMENSIONAL SPACE

(75) Inventors: Roland Aubauer, Wessling (DE); Artem Ivanov, Gilching (DE); Thomas Kandziora, Weil (DE); Manfred Schacht, Munich (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 0 days.

(21) Appl. No.: 13/140,837

(22) PCT Filed: Feb. 9, 2011

(86) PCT No.: PCT/EP2011/051914
§ 371 (c)(1),
(2), (4) Date: Jul. 12, 2011

(87) PCT Pub. No.: WO2011/098496
PCT Pub. Date: Aug. 18, 2011

(65) Prior Publication Data
US 2012/0313882 A1    Dec. 13, 2012

(30) Foreign Application Priority Data
Feb. 10, 2010 (DE) .................. 10 2010 007 455

(51) Int. Cl.
*G06F 3/044* (2006.01)
(52) U.S. Cl.
CPC .................. *G06F 3/044* (2013.01)
(58) Field of Classification Search
USPC ..... 345/173–178; 178/18.01–20.04; 715/863
See application file for complete search history.

(56) References Cited

U.S. PATENT DOCUMENTS

| | | | |
|---|---|---|---|
| 5,844,415 A | 12/1998 | Gershenfeld et al. | 324/663 |
| 7,379,563 B2 | 5/2008 | Shamaie | 382/103 |

(Continued)

FOREIGN PATENT DOCUMENTS

| | | | | |
|---|---|---|---|---|
| GB | 2286247 A | 8/1995 | | B60N 2/00 |
| JP | 07295735 A | 11/1995 | | B60N 2/00 |

(Continued)

OTHER PUBLICATIONS

European Office Action, European Patent Application No. 11 703 866.1-2211, 4 pages, dated May 8, 2012.

(Continued)

*Primary Examiner* — Chad Dicke
(74) *Attorney, Agent, or Firm* — Slayden Grubert Beard PLLC

(57) ABSTRACT

The invention relates to a method for the contactless detection and recognition of gestures in a three-dimensional movement space (3D gestures), wherein
in an electrical near-field which defines the three-dimensional movement space, deformations of the electrical near-field are detected which can be performed by movements of at least one object, e.g. one or two fingers in the three-dimensional movement space,
at least one movement path is generated from the detected deformations of the electrical near field, which corresponds to the movement of the at least one object in the three-dimensional movement space, and
wherein during the generation of the movement path in the movement path a gesture start is determined, wherein beginning with the gesture start the gesture is extracted from the movement path.
The invention also relates to a system for the contactless detection and recognition of gestures in a three-dimensional movement space.

33 Claims, 12 Drawing Sheets

(56) References Cited

U.S. PATENT DOCUMENTS

Figure 1:
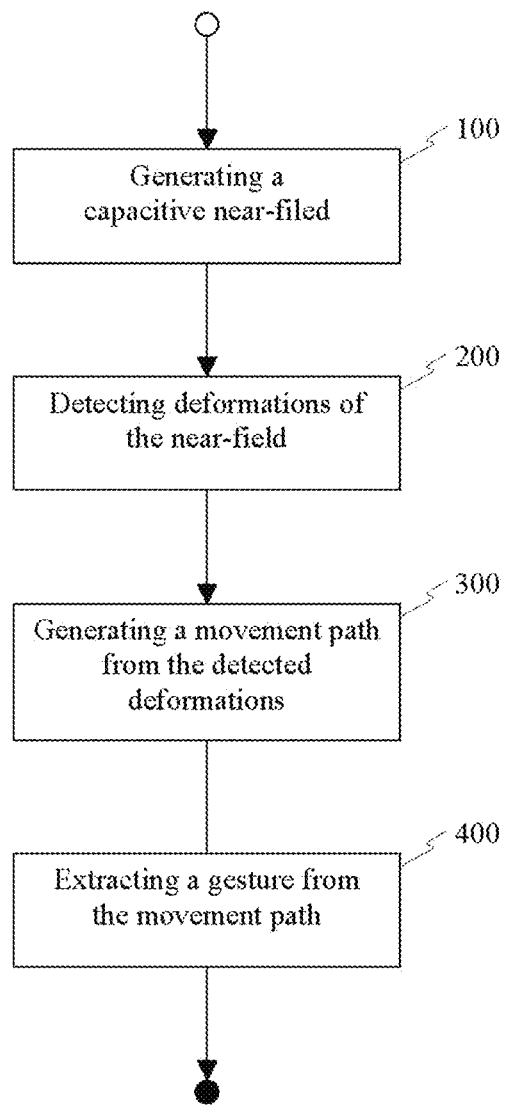

| | | | | |
|---|---|---|---|---|
| 2004/0125083 | A1* | 7/2004 | Lengeling | G06F 3/038 345/157 |
| 2004/0196266 | A1* | 10/2004 | Matsuura | G06F 3/0233 345/169 |
| 2006/0161871 | A1 | 7/2006 | Hotelling et al. | 715/863 |
| 2006/0187214 | A1* | 8/2006 | Gillespie | G06F 3/03547 345/173 |
| 2008/0012835 | A1* | 1/2008 | Rimon et al. | 345/173 |
| 2008/0122798 | A1 | 5/2008 | Koshiyama et al. | 345/173 |
| 2008/0158180 | A1* | 7/2008 | Krah | G06F 3/03545 345/173 |
| 2008/0266271 | A1* | 10/2008 | Van Berkel | G06F 3/041 345/174 |
| 2009/0231295 | A1* | 9/2009 | Petit | G06F 3/04883 345/173 |
| 2009/0273571 | A1* | 11/2009 | Bowens | G06F 3/03547 345/173 |
| 2009/0327974 | A1 | 12/2009 | Abanami et al. | 715/863 |
| 2010/0020025 | A1* | 1/2010 | Lemort | G06F 3/04883 345/173 |

FOREIGN PATENT DOCUMENTS

| | | | | |
|---|---|---|---|---|
| JP | 2005056059 A | 3/2005 | | G06F 3/00 |
| JP | 2007533043 A | 11/2007 | | G06F 3/01 |
| JP | 2008502072 A | 1/2008 | | G06F 3/041 |
| JP | 2008040966 A | 2/2008 | | B60R 11/02 |
| JP | 2008117371 A | 5/2008 | | G06F 3/041 |
| WO | 2008/116642 A2 | 10/2008 | | G06F 3/01 |
| WO | 2009/158213 A2 | 12/2009 | | G06F 1/16 |

OTHER PUBLICATIONS

International PCT Search Report, PCT/EP2011/051914, 2 pages, dated Apr. 27, 2011.

Darrell, Trevor et al., "Space-Time Gestures," Perceptual Computing Group, MIT Media Laboratory, XP000416324, 6 pages, 1993.

European Office Action, Application No. 11 703 866.1-2211, 7 pages, dated Jan. 7, 2013.

Chinese Office Action, Application No. 201180008083.3, 9 pages, dated Dec. 22, 2014.

Japanese Office Action, Application No. 2012-552387, 5 pages, dated Feb. 3, 2015.

Korean Office Action, Application No. 1020127022398, 6 pages, dated Nov. 21, 2016.

Chinese Office Action, Application No. 201180008083.3, 3 pages, dated Oct. 14, 2015.

Korean Office Action, Application No. 20127022398, 5 pages, dated Aug. 28, 2017.

* cited by examiner

SYSTEM AND METHOD FOR CONTACTLESS DETECTION AND RECOGNITION OF GESTURES IN A THREE-DIMENSIONAL SPACE

CROSS REFERENCE TO RELATED APPLICATIONS

This application is the US-national stage of PCT application PCT/EP2011/051914 filed 9 Feb. 2011 and claiming the priority of German patent application 102010007455.1 itself filed 10 Feb. 2010, whose entire disclosures are herewith incorporated by reference.

FIELD OF THE INVENTION

The invention relates to a system and a method for the contactless detection and recognition of gestures in a three-dimensional movement space, which are carried out by movements of at least one object in the three-dimensional movement space.

STATE OF THE ART

From prior art methods and systems for the contactless detection and recognition of gestures are known. So for example solutions are known which are based on optic methods. In them continuously images are taken, which are fed to an image processing. The image processing is designed in such a way as to extract data from the taken images, which for example represent a hand or a finger. From the extracted data the movement of the hand or the finger is determined. The determined movement is subjected to an analysis, which performs a gesture recognition and as a result provides a gesture or information relative to the recognized gesture. Such systems and methods are however very expensive and computation-intensive and, in case of different or bad lighting conditions, frequently lead to problems. Moreover such systems are mostly suitable only for stationary operation, because the image-taking units needed for this purpose, like for example camera systems, are not suitable for the mobile use.

For the mobile use touch-sensitive systems, like for example touch-sensitive displays, are more suitable, since for this purpose no additional recognition systems for recognizing a movement of a hand or a finger are necessary. Well known touch-sensitive recognition systems however have the disadvantage that for recognizing a movement, on the one hand a contact, for example with the touch-sensitive display, is necessary and on the other hand only movements in two dimensions, i.e. in X or Y direction are possible on the input surface. This way of recognizing a movement is thus limited to two degrees of freedom, so that movements or gestures which also involve the third dimension (Z direction) cannot be considered.

OBJECT OF THE INVENTION

The object of the invention is therefore to provide a method and a system for contactless detection and recognition of gestures, which on the one hand allow a detection and recognition of spatial gestures and on the other hand are also suitable for the use in mobile devices or systems.

SOLUTION ACCORDING TO THE INVENTION

This object is achieved according to the invention with a system and a method for the contactless detection and recognition of gestures according to the independent claims.

According to them, a method for the contactless detection and recognition of gestures in a three-dimensional movement space is provided, wherein
in a electrical near-field, which defines the three-dimensional movement space, deformations of the electric near-field are recognized, which can be effected by movements of at least one object in the three-dimensional movement space,
at least one movement path is generated from the recognized deformations of the electrical near-field, which corresponds to the movement of the at least one object in the three-dimensional movement space, and
wherein during the generation of the movement path a beginning of a gesture is determined in the movement path, wherein starting with the beginning of a gesture the gesture is extracted from the movement path.

In this way it is possible for the first time to detect movements in a three-dimensional space and to recognize gestures from them, without needing to provide own image-taking devices, like for example camera systems, so that the method is also particularly well suitable for the mobile use, e.g. in mobile phones and game consoles.

The generation of the at least one movement path may consider at least one object property of the at least one object, the at least one object property being derived from the deformations of the electrical near-field.

The precision of the method according to the invention in that way can be clearly improved, because not each movement in the movement space leads to a movement path to be evaluated. In this way also recognition speed may be increased.

Deriving of the at least one object property may consider a advance information, which will be provided for the step of the generation of the movement path. Thus the movement path may be more efficiently generated, i.e. faster and more precisely, since e.g. measuring inaccuracies can be at least partially compensated with the help of the advance information.

The object properties may include one of the following: form of the object, size of the object, number of objects, orientation of the object relative to a reference surface, electrical material property; and a combination of them. In this way the movement path can be determined more precisely.

Particularly the movement path can be determined very exactly and very fast, if the object property and the advance information are considered in recognizing the movement path.

Preferably only such deformations of the electrical near-field are considered in the generation of the movement path, which fulfil at least one predetermined deformation criteria. Thus for example deformations in the outer edge zone of the near-field may remain unconsidered.

The deformation criteria may be:
distance of the object causing the deformation relative to the reference surface,
absolute and/or relative field variation,
first and/or second derivation of the field variation according to time,
and/or a combination thereof.

It has been proven advantageous to assign to each point of the movement path a number of movement characteristics. The movement characteristics may include:
position of the object relative to the reference surface;
orientation of the object relative to the movement space;
speed of the object;

acceleration of the object; and/or a combination thereof.

The extraction of a gesture from the movement path may include an extraction of a discrete gesture and an extraction of a continuous gesture.

It is particularly advantageous to assign a context information to the extraction of a gesture. In this way, on the one hand the identification rate can be considerably increased. On the other hand the identification speed can also be considerably increased.

The context information may include a first context information, which indicates that a discrete gesture is to be extracted, and a second context information, which indicates that a continuous gesture is to be extracted.

In an assigned first context information the extracting of a gesture from the movement path may include a step for recognizing a gesture end from the movement path.

The beginning of a gesture and/or the end of a gesture may be determined by comparing at least one movement characteristic with at least one threshold value, wherein exceeding/falling below the threshold value is indicative for the end of a gesture and/or the beginning of a gesture.

The exceeding/falling below of the threshold value may be indicative for the beginning of a gesture and/or the end of a gesture when exceeding/falling below the threshold value for a predetermined duration. Thus it is prevented that very short exceeding/falling below of the threshold value is erroneously recognized as a beginning of a gesture and/or as an end of a gesture.

In case of several movement characteristics, the exceeding/falling below of the respective threshold values may be indicative for the beginning of a gesture and/or for the end of a gesture when the respective threshold values are exceeded/fallen below in a predetermined order.

It is advantageous if the context information includes a third context information, which includes a set of reference gestures, wherein the set of reference gestures indicates which gestures are to be extracted, the reference gestures being preferably described according to a gesture grammar.

Thus identification rate and identification speed can be further considerably increased, because only a number of reference gestures is used for the gesture recognition. In a particular embodiment gesture recognition may be broken off even before the end of a gesture if the gesture to be recognized cannot be assigned to any reference gesture.

The extracting of a gesture may include a pattern recognition for recognizing the extracted gesture.

An extracted discrete gesture may be forwarded completely to the pattern recognition as soon as the end of the gesture has been determined.

After recognizing the gesture start, the movement path may be also continuously fed to the pattern recognition, wherein the continuously fed movement path is, also continuously, compared by the pattern recognition with partial gestures of reference gestures, in order to determine, from the reference gestures, the reference gestures corresponding to the continuously fed movement path.

The pattern recognition may include a step for segmenting the gesture in single gesture segments, the gesture segments being then compared with the corresponding gesture segments of reference gestures.

In the generation of the at least one movement path a compensation method may be carried out, with which segments which correspond to unintentional movements of the object in the movement space are eliminated from the movement path. In this way the error tolerance in recognizing and recognizing gestures can be considerably improved.

The compensation method is carried out preferably during recognizing the movement path.

The electrical near-field may be emitted on at least one electrode and the deformations of the electrical near-field may be recognized by at least one electrode, the alternating electrical field being emitted with a predetermined frequency, preferably with a frequency between 10 kHz and 300 kHz, particularly preferably with a frequency between 20 kHz and 200 kHz, most particularly preferably with a frequency between 75 kHz and 125 kHz.

Recognizing the deformations of the electrical near-field may be done by measuring changes of the alternating electric field received or emitted at the respective electrode, wherein the changes include a change of phase, amplitude and/or frequency.

The at least one object may include a hand, a finger, limbs, and/or a fingertip.

In a preferred embodiment of the invention, the generation of the movement path is designed for generating, in a movement of the hand with one or several distinguishable fingers, one or several movement paths corresponding to the fingertips of the one finger or the several distinguishable fingers.

Thus multi-finger-gestures in a three-dimensional space can be for the first time captured and recognized without needing further means, like for example cameras.

A gesture may be formed by several gestures (partial gestures) extracted from several movement paths, which is particularly advantageous, if simultaneously gestures are input with several digits, wherein the input gestures are components of a total gesture.

Also a context-free grammar for describing gestures and/or reference gestures is provided by the invention. The use of reference gestures, which has been described with the gesture grammar, has the advantage that a gesture recognition in the technical method according to the invention may be realized in a particularly simply manner. Advantageously the reference gestures are stored in a database, wherein an indexed access over the segments of the reference gestures on the reference gestures may take place. The indexed access, particularly in the case of the continuous, i.e. sequential gesture recognition, has proven advantageous, because the relevant reference gestures based on the already recognized gesture segments may be filtered by means of simple database inquiries. The database may be an embedded database, which is particularly suitable for being realized in a microcontroller, the method according to the invention being also suitable for being realized in a microcontroller.

By the invention also a system for the contactless recognition and recognition of gestures in a three-dimensional movement space is provided, which comprises:

means for generating an electric near-field which defines the movement space, means for recognizing deformations of the electrical near-field which are caused by movements of at least one object in the movement space, means for the generation of at least one movement path from the recognized deformations of the electrical near-field, which corresponds to the movement of the at least one object, and means for recognizing a gesture start in the movement path while the movement path is being generated, and means for extracting the gesture from the movement path starting with the gesture start.

The means for the generation of the electrical near-field may include at least one transmitting electrode, at which an alternating electrical field may be emitted, and at least one signal generator which is coupled with the at least one transmitting electrode, for charging the at least one transmitting electrode with an electrical alternating signal.

The means for recognizing deformations of the electrical near-field may include at least one reception electrode and an evaluating device coupled with it, for recognizing a change of the frequency, the amplitude and/or the phase of an alternating electrical field coupled into the reception electrode or an alternating electrical field emitted at the reception electrode.

Preferably the frequency, the amplitude and/or the phase of the electrical alternating signal are adjustable.

The system according to the invention may be implemented as an application specific integrated circuit (ASIC).

Also a method for detecting contactless movements in a three-dimensional movement space is provided, which is defined by an electrical near-field, wherein the method at least includes
- a recognition of deformations of the electrical near-field, which can be effected by movements of at least one object in the three-dimensional movement space, and
- a generation of at least one movement path from the recognized deformations of the electrical near-field, which correspond to the movements of the at least one object.

Moreover a method for recognizing gestures from at least one movement path is provided by the invention, which is detectable with the method according to the invention for detecting contactless movements, and which includes a step for the extraction of at least one gesture from the at least one movement path.

Further benefits and advantageous embodiments of the invention result from the description, the drawing, and the claims.

SHORT DESCRIPTION OF THE FIGURES

Figure 2:
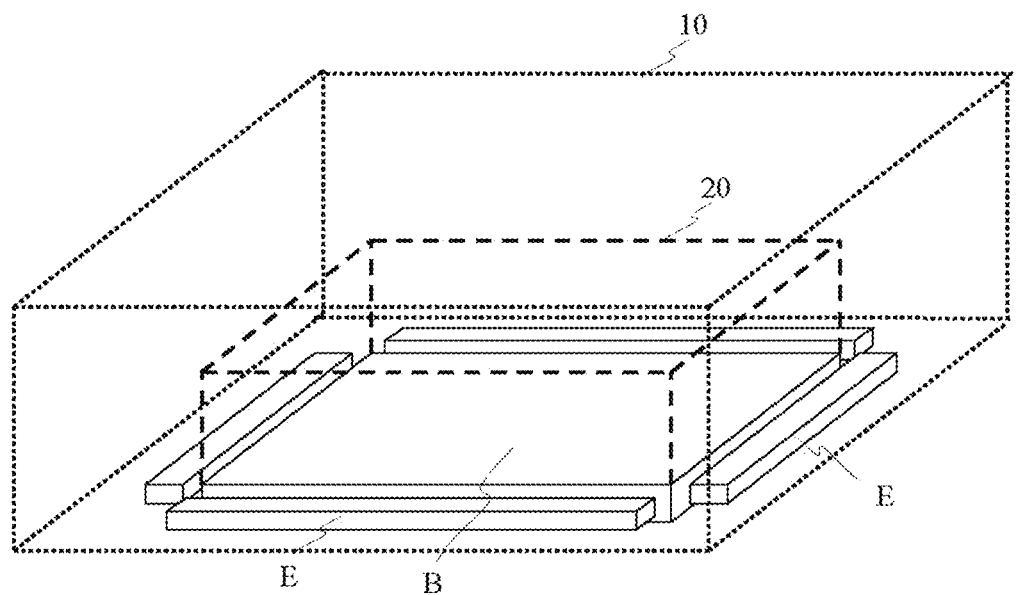
Figure 2:
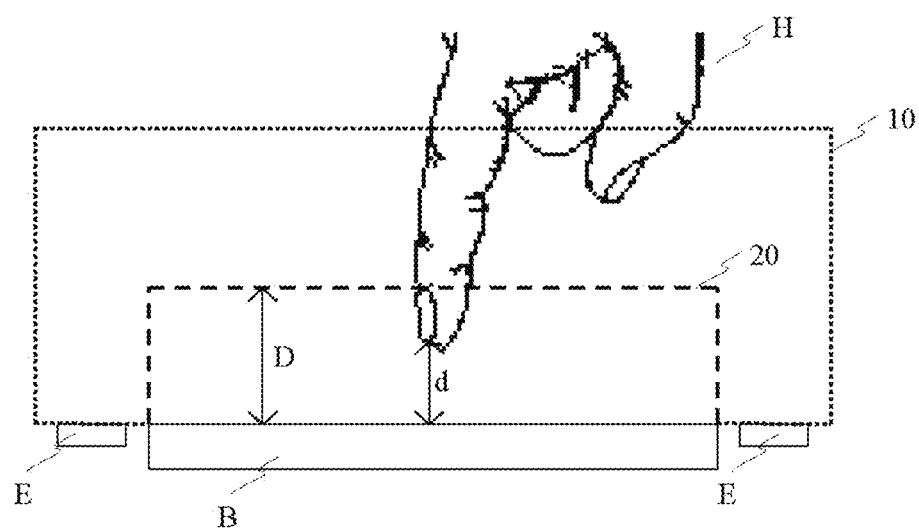
Figure 3:
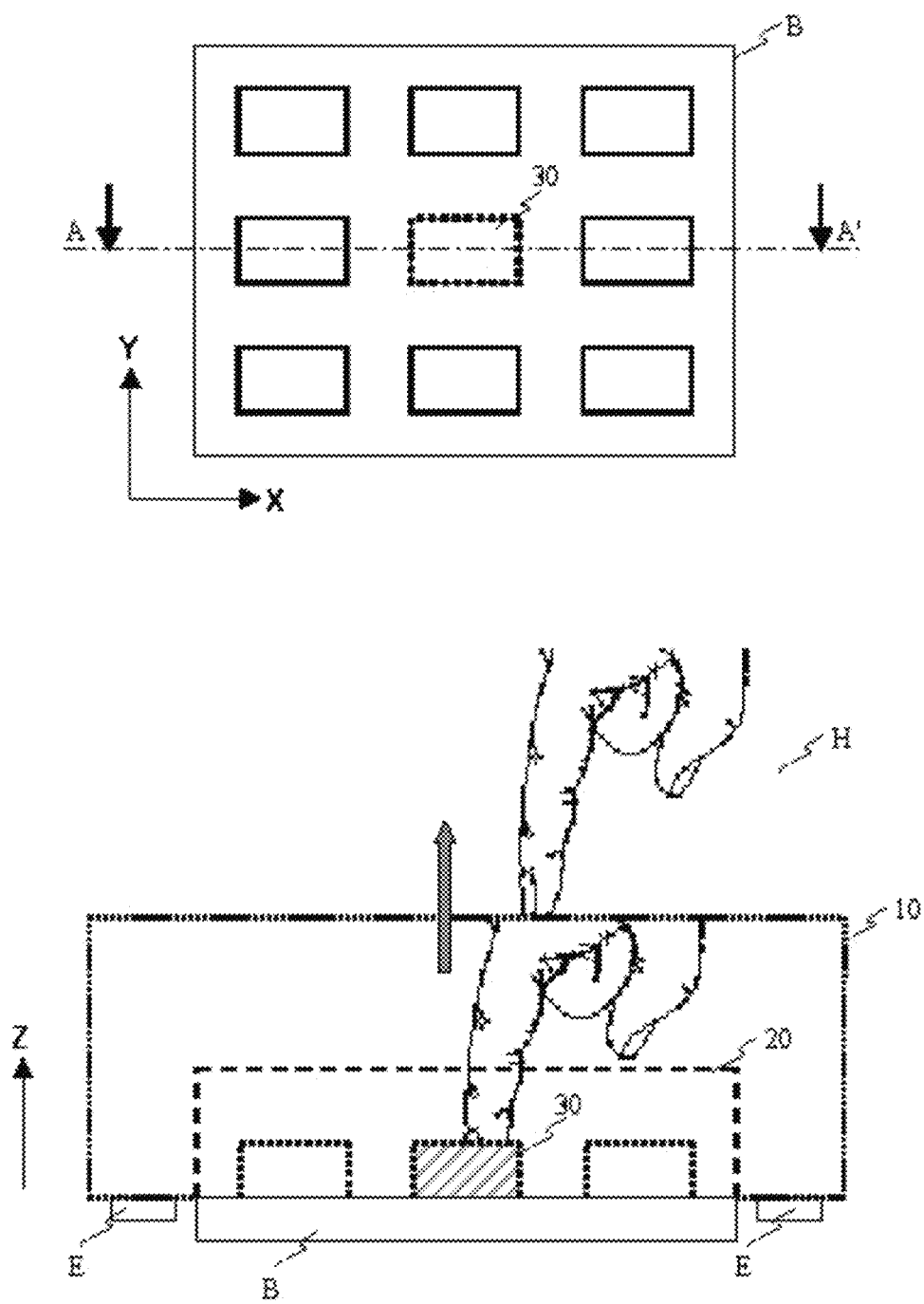
Figure 4:
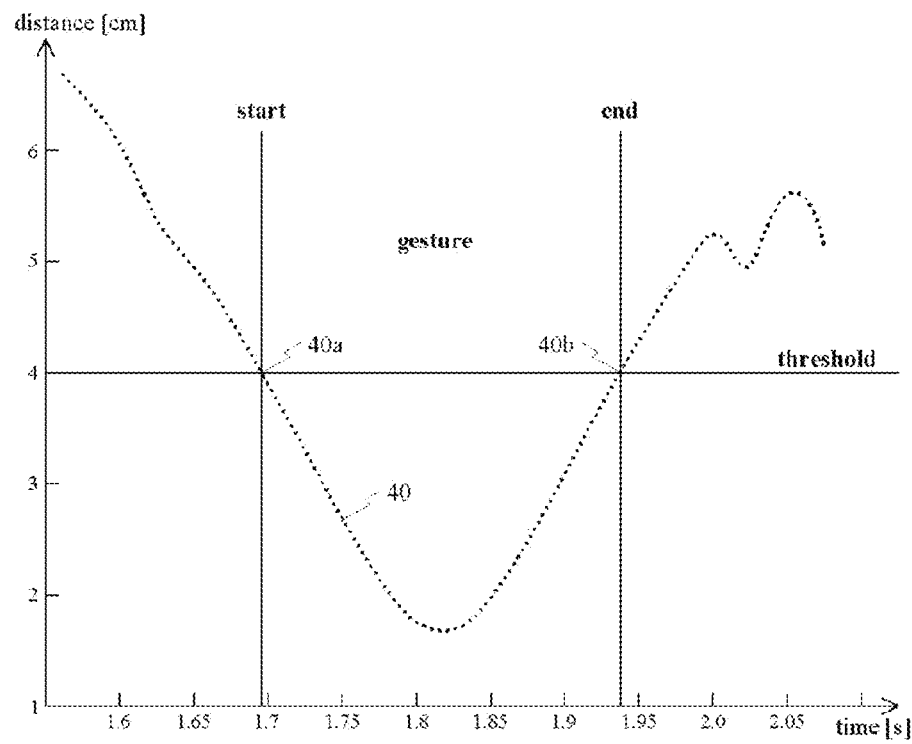
Figure 5:
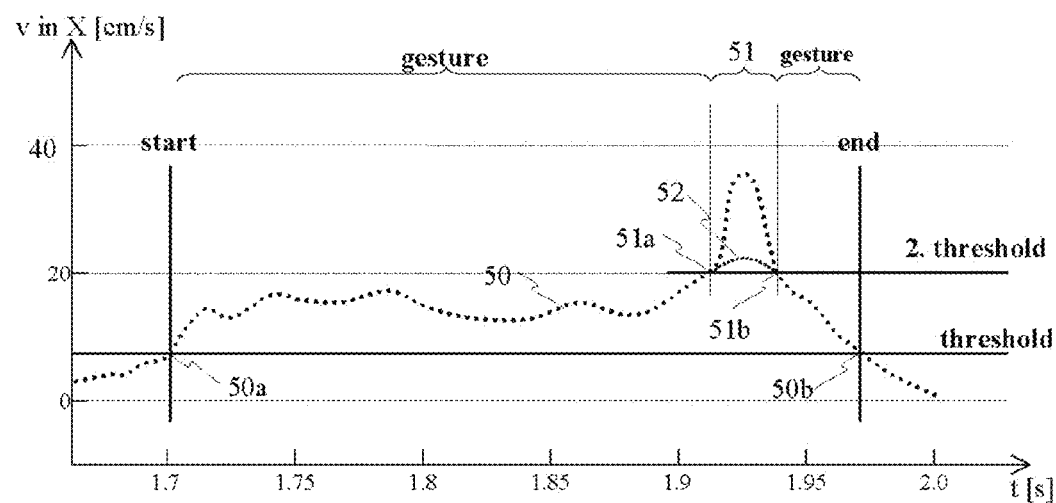
Figure 6:
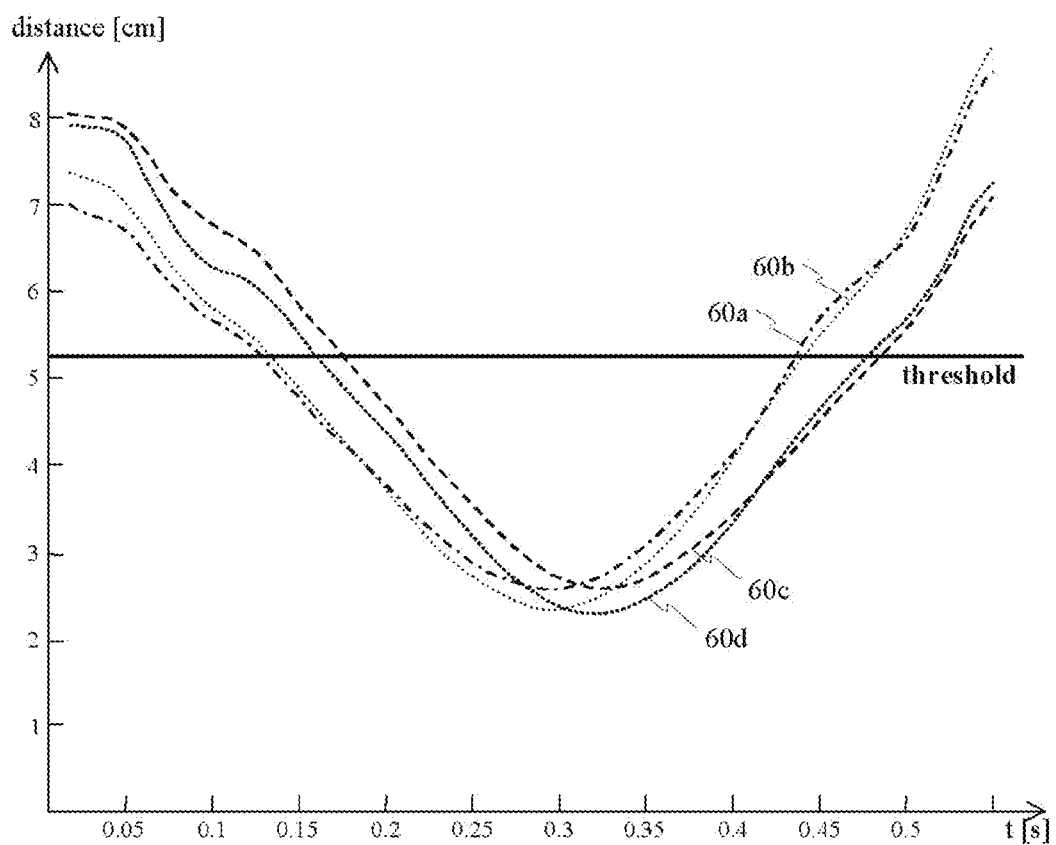
Figure 8:
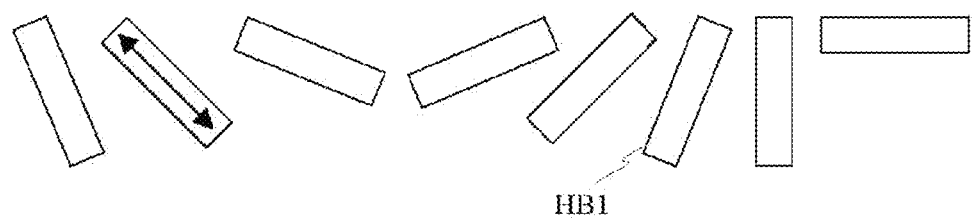
Figure 7A:
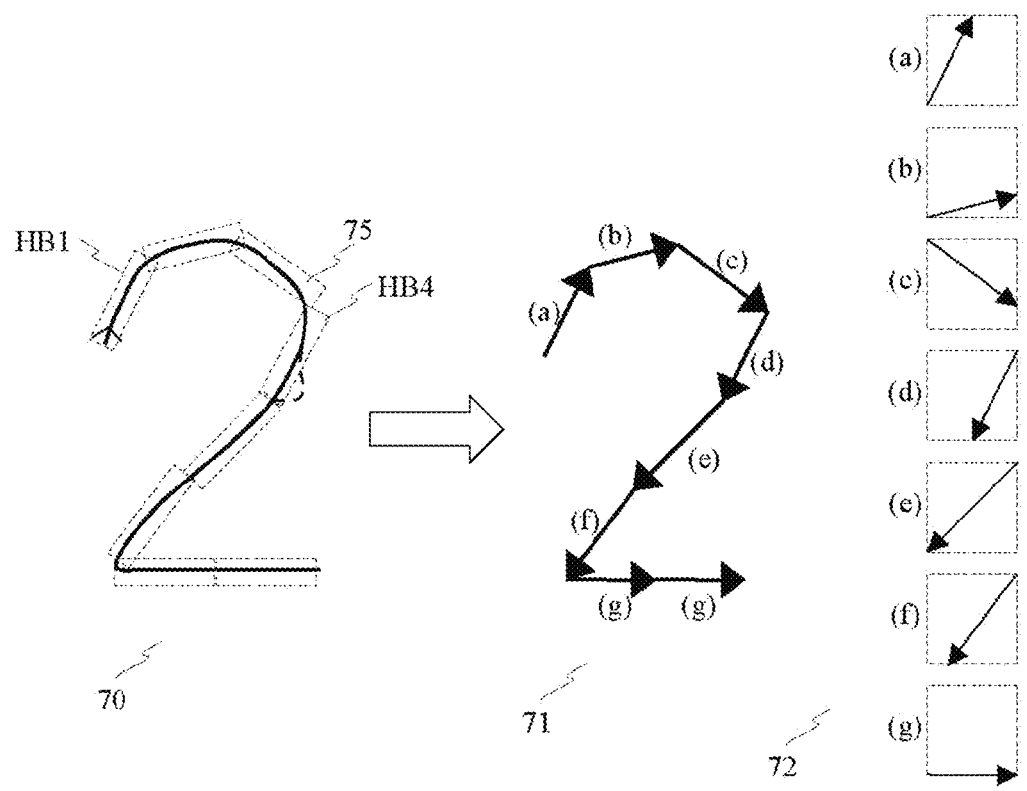
Figure 7B:
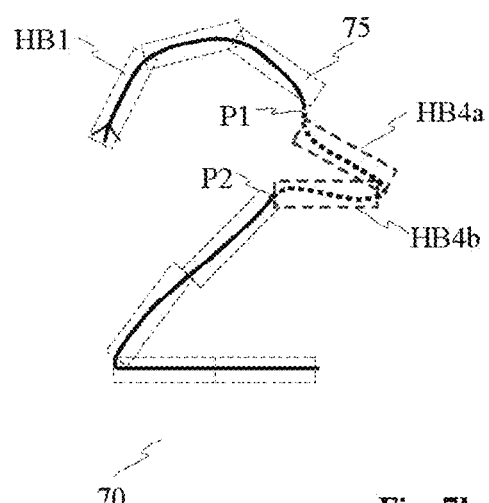
Figure 9A:
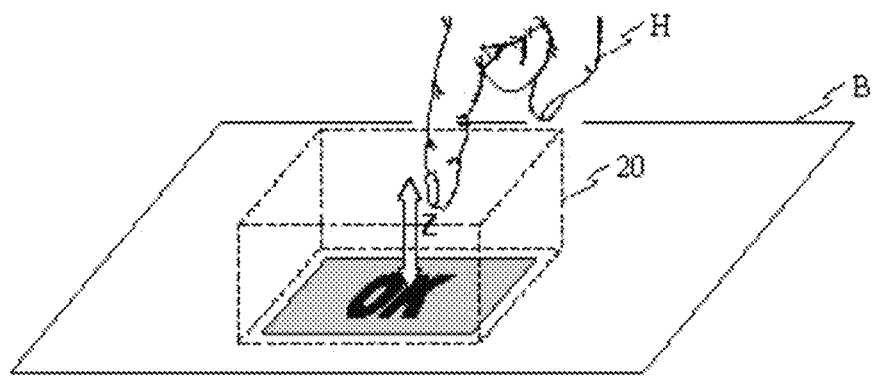
Figure 9B:
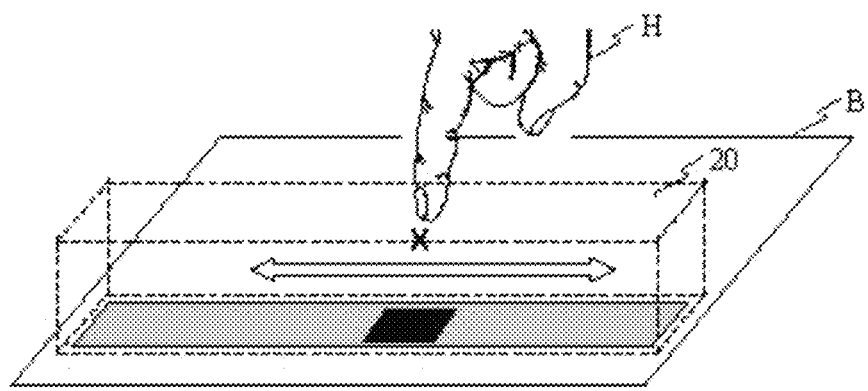
Figure 10:
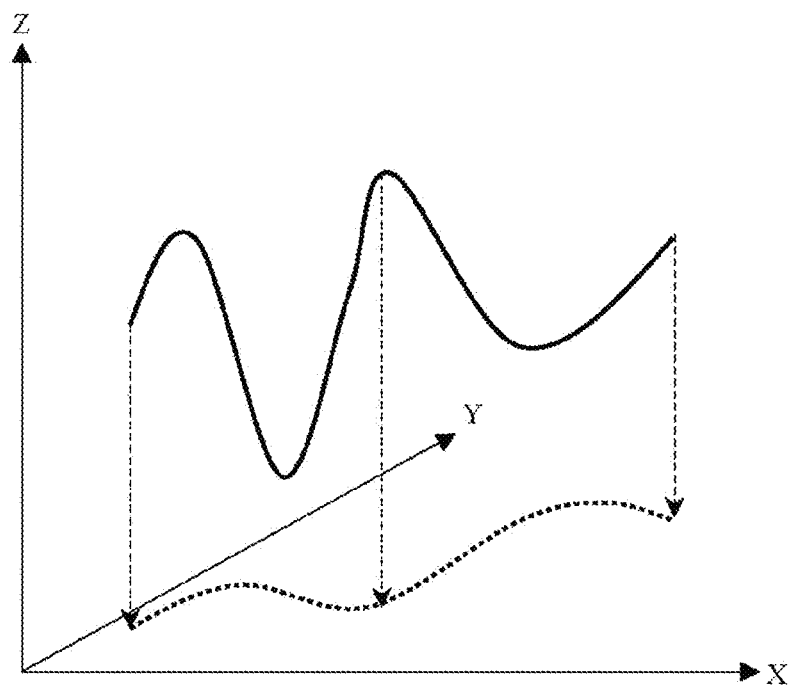
Figure 11:
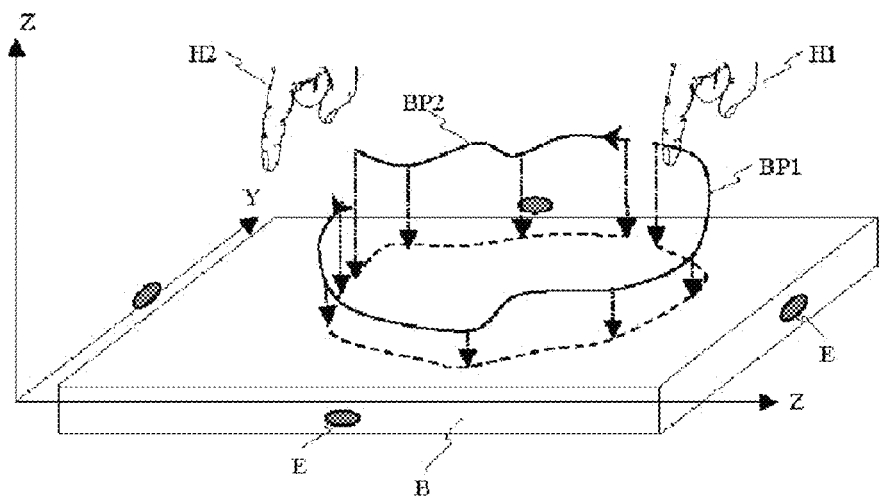
Figure 12A:
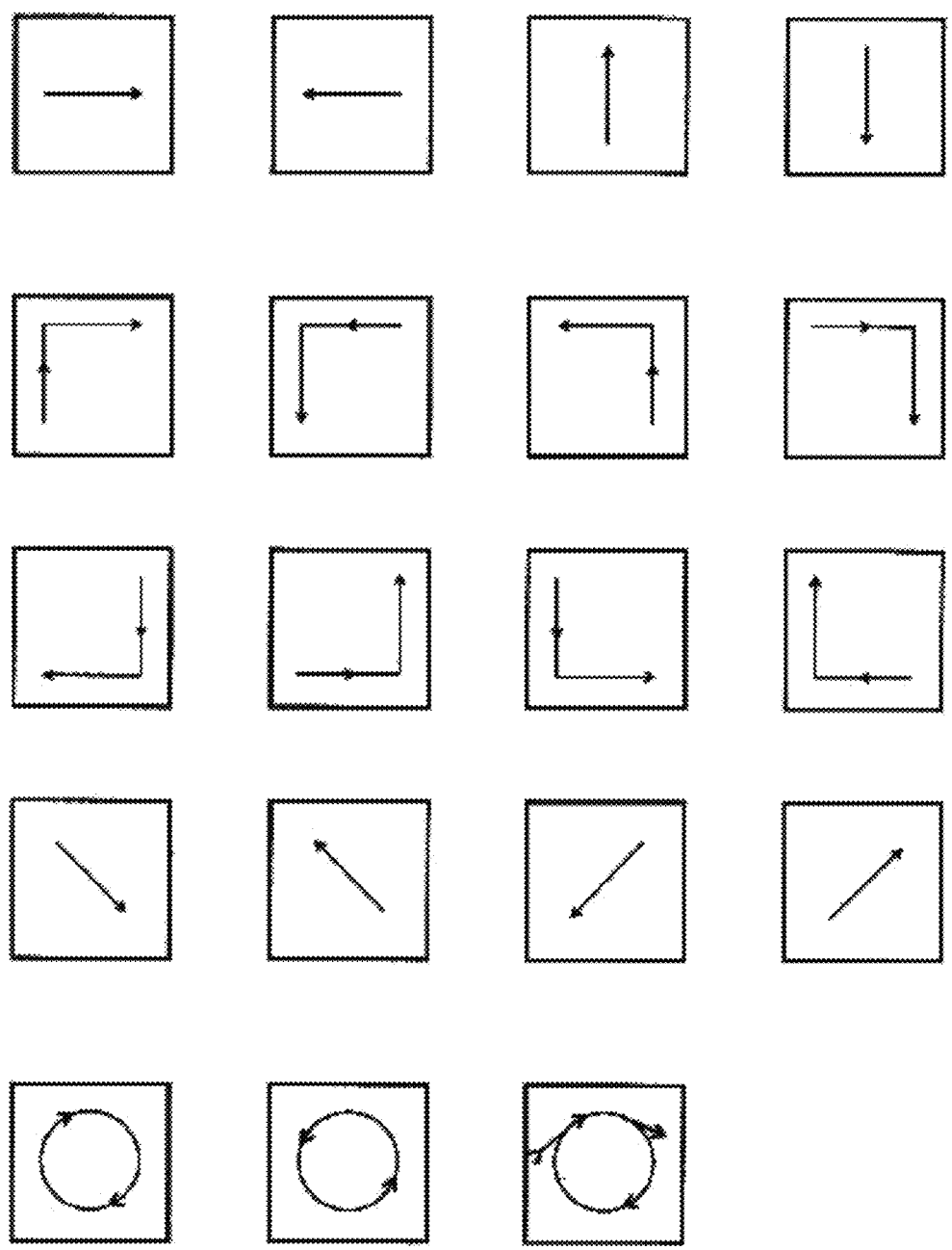
Figure 12B:
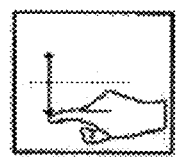
Figure 12B:
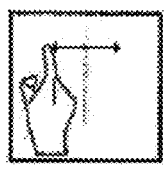
Figure 12C:
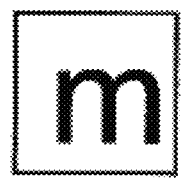
Figure 12C:
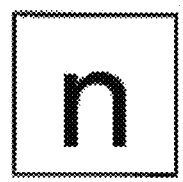
Figure 12C:
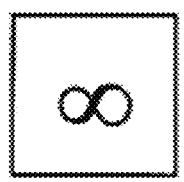
Figure 12C:
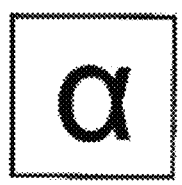
Figure 12C:
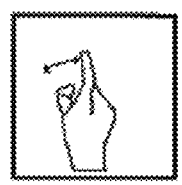
Figure 12C:
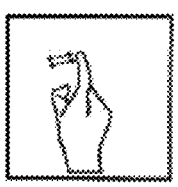
Figure 12C:
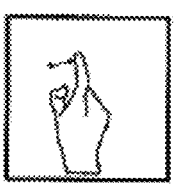
Figure 12C:
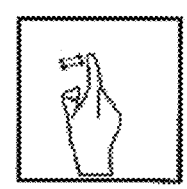
Figure 12C:
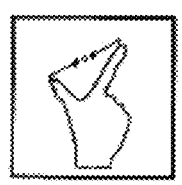
Figure 12C:
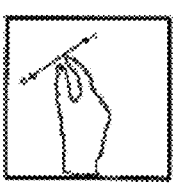
Figure 12C:
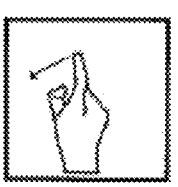
Figure 12C:
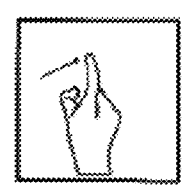
Figure 12C:
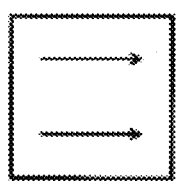
Figure 12C:
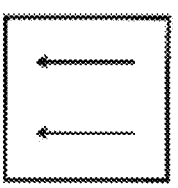
Figure 12C:
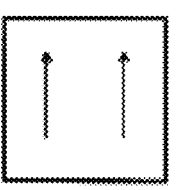
Figure 12C:
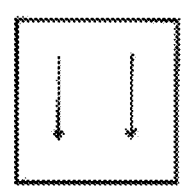
Figure 12C:
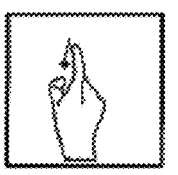
Figure 12C:
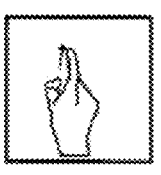
Figure 12D:
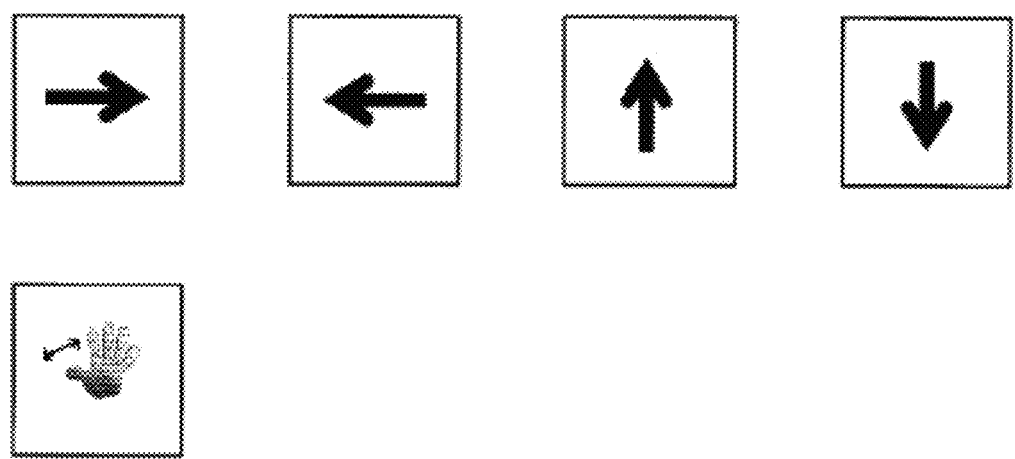

In the drawing, embodiments are illustrated in a schematically simplified way and are explained more in detail in the following description. The drawing show:

FIG. 1 a flowchart of the method according to the invention for the contactless detection and recognition of gestures;

FIG. 2 a spatial view of a movement space generated by means of an electrical near-field as well as of a recognition space arranged in the movement space;

FIG. 3 a movement space generated by means of an electrical near-field, a recognition space arranged in the movement space as well as several active areas arranged in the recognition space, to which each time one action is assigned;

FIG. 4 a first example of a threshold value method for determining a beginning and an end of a gesture;

FIG. 5 a second example of a threshold value method for determining the beginning of a gesture and the end of a gesture;

FIG. 6 another example of a threshold value method for determining the beginning of a gesture and the end of a gesture;

FIG. 7a an example of a gesture which is composed of several gesture segments of a gesture alphabet;

FIG. 7b an example of a movement path with a defective segment, which is correctable;

FIG. 8 examples of hit boxes for the splitting (segmentation) of a movement path;

FIG. 9a an example of a movement, wherein for the gesture recognition only the Z direction is relevant;

FIG. 9b an example of a movement, wherein for the gesture recognition only the X direction is relevant;

FIG. 10 an example of a movement path in the three-dimensional space, wherein for the gesture recognition only the X- and the Y direction (coordinates) are evaluated;

FIG. 11 an example of a gesture, which is extracted from two movement paths (two-finger gestures);

FIG. 12a-12c a gesture inventory with a number of one-finger gestures and two-finger gestures; and FIG. 12d a gesture inventory with a number of hand gestures.

DETAILED DESCRIPTION OF THE INVENTION

FIG. 1 shows a flowchart of a method for the contactless detection and recognition of gestures.

In a first step 100, by means of an electrode system an electrical near-field is generated, which is formed preferably as a quasi static alternating electrical field which defines a movement space relative to a reference surface, for example a screen or a tablet PC.

The frequency f of the alternating electrical field is to be chosen in such a way that the period T corresponding to the frequency f of the alternating electrical field of the field variation (T=1/f) is much smaller than the time the light needs to cover the stretch L, wherein L corresponds to the size of the reference surface, i.e. the wavelength of the electromagnetic waves is in case of the frequency F much bigger than the system sizes L (T>>L/c or f<<c/L, wherein c is the speed of light). Frequencies between 10 kHz and 300 kHz, preferably frequencies between 75 kHz and 100 kHz have proven particularly suitable. A frequency of approximately 100 kHz corresponds to a wavelength of ca. 3 km, which exceeds by far the size of the reference surface.

Near-field is the area, wherein the distance from the field source is much smaller than the wavelength, so that the field cannot be considered as an electromagnetic wave but as a quasi static field. The field strength at the electrode system decreases with the distance r from the electrodes of the electrode system approximately proportionally between $1/r$ to $1/r^2$. This indicates that also the sensitivity of the electrode system decreases with the distance. The sensitivity area of the electrode system is thus limited to the space "close" to the electrodes.

The reference surface may be for example a display device of a mobile device, for example a mobile phone or a tablet PC. The display device may also be touch-sensitive, so that in addition to the contactless detection and recognition of gestures also inputs by means of touching the display device can be recognized. As a reference surface also a "passive" surface, e.g. the surface of a cabinet door, may be provided, which with the system according to the invention can be made an input surface.

For the generation of the quasi static alternating electrical field, which in the following will be called electrical near-field, several electrodes distanced among each other may be provided, at which each time an alternating electrical field is emitted. An electrical alternating signal supplied to the respective electrodes, which is provided by one or several generators, is set in such a way that the electrical alternating fields emitted at the electrodes jointly may span the movement space around the electrodes relative to the reference surface.

In the movement space, in a next step 200 deformations of the lines of force of the electrical alternating field are recognized, which are produced for example by movements of at least one object in the movement space. For example a deformation of the lines of force may be caused by movements of a finger or several fingers in the movement space. The deformations of the lines of force may be recognized at the electrodes, at which the electrical alternating fields are emitted, by determining a change of the load at the respective generators coupled with the electrodes. Deformations of the lines of force of the electrical alternating fields are called in the following deformations of the electrical near-field. Further embodiments for the generation of the electrical alternating fields and for recognizing deformations of the lines of force of the electrical near-field are indicated in regard to FIG. 2.

From the recognized deformations in a next step 300 a movement path is generated, which corresponds to the movement, for example of a finger, in the movement space. Thus according to the invention also several movement paths may be generated, if for example several fingers are moved in the movement space.

In the generation of the movement path one or more object properties of the object moving in the movement space may be considered. For example, for the generation of the movement path the form of the object may be considered. That is for example necessary when a hand with stretched forefinger immerses in the movement space and thus the total hand causes deformations of the electrical near-field. Regardless of the form a movement path would be generated, which substantially corresponds to the movement of the gravity center of the hand moving in the movement space. A movement path generated in such a way may possibly lead to a defective gesture recognition, because the movement of the gravity center of the hand does not always correspond with the movement of the stretched forefinger.

In order to avoid this, the form of the hand moving in the movement space is considered in the generation of the movement path, wherein the form of the hand is in turn derived from the deformations of the electrical near-field. From the form of the hand the fingertip of a stretched finger may then be determined, so that a movement path may be determined which corresponds to the movement of the fingertip.

In a further embodiment of the invention the movement of several fingers may also be recognized and evaluated, wherein for each stretched finger the fingertip is determined.

In the generation of the movement path according to the invention only such deformations of the electrical near-field are considered which meet predetermined criteria. A criterion may be for example the distance of the object causing the deformation from the reference surface. Thus is guaranteed that for example movements carried out in the area of the outer edge of the movement space are not considered in the generation of the movement path.

In the generation of the movement path, each point of the movement path is assigned a number of movement characteristics, so that from the movement accomplished in the movement space one or more gestures may be reliably extracted. Such movement characteristic may be for example the position of the object, for example the fingertip of a forefinger relative to the reference surface, the orientation of the hand or the forefinger relative to the movement space, the speed of the fingertip, the acceleration of the fingertip or a combination thereof. As is described in more detail in regard to FIGS. 4 to 6, these movement characteristics may also be used for the determination of the beginning of a gesture and the end of a gesture of one or several gestures.

In one step 400 one or more gestures are extracted from the generated movement path. According to the invention discrete gestures and/or continuous gestures may be extracted.

A discrete gesture is characterized by a gesture start, a gesture end and a movement between a gesture start and a gesture end. A continuous gesture is characterized by a gesture start and a movement following the gesture start, whereas a continuous gesture must not necessarily have a gesture end.

When extracting a gesture from the movement path, at first a gesture start is determined in the movement path, both for a discrete gesture and for a continuous gesture. The gesture start is determined during the generation of the movement path. As soon as the gesture start has been determined, a gesture may be extracted, beginning with the gesture start. Concrete methods for recognizing the gesture start are described in more detail referring to the FIGS. 4 to 6.

With the help of a pattern recognition, the extracted gestures may be recognized. For the pattern recognition for example Hidden Markov models, a Viterbi algorithm and/or Bayesian networks may be used. Another recognition method according to the invention is described in more detail in regard to FIG. 7.

If discrete gestures are to be detected and recognized, each time one complete gesture extracted from the movement path can be fed to pattern recognition. This may take place for example as soon as the end of the gesture has been determined. Recognizing a gesture end is described in more detail also in regard to the FIGS. 4 to 6.

If continuous gestures are to be recognized, after detecting the gesture start, the movement path following the gesture start is continuously fed to pattern recognition. The continuously fed movement path is subjected by the pattern recognition also continuously to a gesture recognition.

For recognizing continuous and discrete gestures, reference gestures are provided, which are used for a pattern comparison with the movement path fed by the pattern recognition. Reference gestures may be gestures which for example are admissible in a certain user context of a device. If in a user context for example only the input of determined letters is admissible, the reference gestures include gestures which are representative for the allowed letters.

The pattern comparison may be carried out in such a way that single segments of the movement path are compared with corresponding partial gestures of the reference gestures. A partial gesture is a segment of a reference gesture. If the single segments of the movement path coincide each time with the partial gestures of a reference gesture, the movement path may be interpreted as a recognized gesture.

In one embodiment of the invention, the set of the possible reference gestures may be reduced after each comparison of a segment of the movement path with the corresponding partial gestures, because with an increasing number of compared segments of the movement path, all those reference gestures for the gesture comparison may be excluded, whose corresponding partial gestures do not coincide with the already compared segments of the movement path. In this way also a break-off of the recognition may be done, as soon as a segment of the movement path no longer may be assigned to a corresponding partial gesture of a reference gesture.

The step 400 for the extraction of one or several gestures from the movement path can be assigned a context information, with which the extraction step 400 can be told if the gesture to be extracted is a discrete gesture or a continuous gesture. Thus the context information indicates which type of gestures must be evaluated. The context information depends substantially on the specific application, wherein the method according to the invention is used. If for example in a display-/input device a slide control is visualized, which with the help of a movement of the hand must be moved without contact to the left or to the right, the context information "continuous gestures" may be assigned to the extraction step 400. A movement of the hand in the movement space assigned to the slide control is then continuously evaluated, so that the slide control may be moved substantially synchronously with the movement of the hand at the display device.

If for example the inputting of letters or numbers at the input device is expected, the context information "discrete gesture" may be assigned to the extraction step 400. Here a movement path between the gesture start and the gesture end is fed to pattern recognition as soon as a gesture end has been recognized in the movement path. Alternatively the movement path of a discrete gesture may be also continuously fed to pattern recognition as soon as gesture start is recognized, which has the advantage that statements may be made about which gesture a user intends to perform, even before the gesture is finished.

The context information assigned to the extraction step 400 may also include a set of reference gestures, which for example indicates which gestures are admissible in the context.

This is for example advantageous when a input device expects an input of numbers.

The context information may include in this respect the digits "0" until "9" as reference gestures. A movement of the forefinger in the movement space which for example would correspond to the letter "A" can then be recognized by the method according to the invention as a not allowed gesture. By using the reference gestures, which define the gestures allowed in a respective context, the probability of misinterpretations in the recognizing of gestures can be considerably decreased.

Moreover an error correction may be done when for example a movement path between a gesture start and a gesture end cannot be assigned to any of the reference gestures, however the movement path resembles a reference gesture. The degree of similarity is adjustable and for example may be set depending on the number of the reference gestures. In a small number of reference gestures a small degree of similarity may be set, which has the advantage that even very inexactly performed movements may reliably lead to a correctly recognized gesture.

In order to ignore unintentionally movements, for example by a finger in the movement space, in extracting gestures from the movement path, a compensation method is proposed, which during the generation of the movement path (step 300) eliminates those segments from the movement path which correspond to unintentional movements of the finger in the movement space. For this purpose for example the speed and/or the acceleration of the finger in the movement space may be used, wherein exceeding or falling below a preset speed or a preset acceleration may be indicative for an unintentional movement of the finger. By extracting such segments from the movement path also the recognition degree in the extraction of gestures from the movement path in the step 400 is increased.

FIG. 2 typically shows the structure of a system according to the invention for the contactless detection of movements in a movement space with four electrodes of an electric sensor system.

In the area of the four edges of a rectangular reference surface B, which may be for example a display device, each time one electrode is arranged, which is a component of an electric sensor system. The electrodes E extend over the total length of the respective edge of the reference surface B. At the electrodes E each an alternating electrical field is irradiated, the four irradiated electric alternating fields jointly defining the movement space 10.

Instead of the four stripe-shaped electrodes E shown in FIG. 2, at the edges of the reference surface B each time one punctiform electrode may be arranged, which makes possible an improved recognition of the space coordinates, for example of a fingertip, in the movement space 10. Also at each edge of the reference surface there may be several punctiform electrodes in order to even further increase the recognition precision.

The punctiform electrodes may be also arranged at the corners of the reference surface B. A punctiform electrode may be formed for example by a flat metal plate which comprises a surface of approximately 0.5 $cm^2$ to 5 $cm^2$. In a concrete form the punctiform electrodes present a surface of 1 $cm^2$.

The single electrodes may be operated as transmitting electrodes and/or reception electrodes.

For example one of the electrodes shown in FIG. 2 may be operated as a transmitting electrode (generator electrode), at which the alternating electric field is emitted. The three other electrodes may be operated as reception electrodes, at which the alternating electric field emitted by the transmitting electrode is received or coupled. From the alternating electric field coupled to the reception electrodes the deformation of the electrical near-field may be determined. The individual reception electrodes may be operated in the multiplex method so that the signals measured at the reception electrodes are fed temporally one after the other to an evaluation unit.

The signals at the reception electrode may be also measured at the same time, which leads to an improved signal-to-noise ratio (SNR).

In an alternative embodiment, one of the electrodes shown in FIG. 2 may be operated as a reception electrode. The other three electrodes may be operated as transmitting electrodes, at which each an alternating electrical field is emitted, which is coupled each time into the reception electrode. The alternating electric field emitted at the transmission electrodes may each time have a different frequency and/or a different phasing.

However the alternating electric fields emitted at the transmission electrodes may also have the same frequency and the same phasing, the transmission electrodes being advantageously operated in a time-division multiplex method.

It is also possible to provide several transmission electrodes and several reception electrodes so that the spatial resolution can be even further increased.

In a further embodiment at least one electrode may be also operated both as a transmitting electrode and as a reception electrode, wherein the deformation of the lines of force is determined by means of the load of the alternating electric field at the generator generating the alternating voltage.

A concrete realization of a system for recognizing a position of a finger in an alternating electric field is described in the German patent application DE 10 2007 020 873 by the applicant.

The movement space may be further subdivided. Inside the movement space 10 a detection space 20 is defined which is smaller than the movement space 10. The detection space 20 inside the movement space 10 is the space which is considered during the generation of the movement path, i.e. only for movements inside the detection space 20 a movement path is generated.

If a hand H or a fingertip enters in the movement space 10, the hand H or the fingertip entails a deformation of the electrical near-field. According to an embodiment of the invention from the deformation of the electrical near-field a movement path is derived however only as soon as the finger or the hand H enters the detection space 20. This may take place for example by evaluating the distance d between the fingertip and the reference surface B. If the distance d between the fingertip and the reference surface B is smaller than the distance D, which indicates the distance for reference surface B inside of which a movement path is derived from the recognized deformations of the electrical near-field, the movement of the fingertip leads to deduce a movement path from the deformations of the electrical near-field caused in that manner.

Providing a detection space 20 has the advantage that deformations of the electrical near-field in the edge zone of the movement space remain unconsidered in the generation of the movement path. Alternatively a deformation of the electrical near-field outside the detection space 20 is also used in order to for example activate an input surface, for example for changing from a sleeping mode into a mode of operation.

FIG. 3 shows a possibility to define active areas relative to the reference surface. In the example shown in FIG. 3, nine active areas are assigned to a reference surface B. To each of the active areas a function may be assigned, which is performed as soon as the corresponding active area is for example selected with the fingertip. The selection may be done by approaching the fingertip to the corresponding active area. The active areas 30 are preferably defined in such a way that they lie inside of the detection space 20. An active area 30 is defined by a space assigned to the active area.

In FIG. 3 active areas are shown in a schematic sectional view. As soon as the tip of the forefinger of the hand H enters the space of the active area 30, it is recognized that the X and Y coordinates of the fingertip lie inside the X or Y coordinates defining the active area 30. Moreover the entrance of the fingertip in the space of the active area 30 is recognized by the fact that the distance (Z coordinate) of the fingertip from the input surface B falls below a predetermined value. The method according to the invention thus can detect the selection of an active area by evaluating the X, Y, and Z coordinates of the finger or the fingertip in the movement space 10 or in the detection space 20. The X, Y, or Z coordinates are determined from the movement path which is derived from the temporal change of the alternating electric field.

The confirmation of the selection of the active area 30 may take place by eliminating or by moving the fingertip in Z direction out of the active area 30. As soon as such a confirmation has been recognized, a corresponding function assigned to the active area 30 may be executed. By the confirmation of the selection, i.e. in moving the fingertip in Z direction, also the speed and/or the acceleration of the movement may be considered. So for example it may be provided that a movement in positive Z direction is interpreted as a confirmation only if the movement exceeds a predetermined speed or a predetermined acceleration.

Alternatively a confirmation may also take place by moving the fingertip in X- or Y direction from the active area to the outside. The confirmation can also take place in such a way that the fingertip lingers for a predetermined period inside the room of the active area 30. So for example the finger may be moved over the input surface B and then enter different active areas, a confirmation of the selection of the corresponding active area being done only if the fingertip lies in the corresponding active area and is not moved inside the active area for a predetermined time.

For the selection or the confirmation of a selection of an active area 30, touching the input surface B is not necessary. Nevertheless the input surface B may be formed as an input surface, in order to extend the functionality together with the method or together with the system for the contactless detection and recognition of gestures.

However the active areas do not have to be provided only for the selection of a determined functionality assigned to the respective active area 30. The active areas 30 may be also be provided to detect movements inside an active area and to detect one or more gestures according to the method according to the invention. Together with the context information for example a first active area 30 may be provided in order to input digits, a second area may for example be provided in order to input letters, and a third active area may be provided in order to make a selection only, as described above.

In the following it is described in more detail in regard to FIGS. 4 to 6, how according to the invention a gesture start and a gesture end in the movement path may be determined. In order to feed a movement detected in the movement space to a pattern recognition, it is at first necessary to detect at least a gesture start. Basically also movements which take place before the gesture start could be led to the pattern recognition, which however would have the disadvantage that movements before the gesture start could lead to a defective gesture recognition if the pattern recognition is not designed for leaving unconsidered movements not belonging to a gesture. For the case that a complete gesture of the pattern recognition is to be conducted, it is also necessary to detect the gesture end in the movement path.

During a movement of for example a fingertip in the movement space, one or several movement characteristics are detected with the help of the electric sensor electronics in predetermined time intervals, for example in time intervals of 5 ms, and assigned to the corresponding point of the movement path. The time intervals may be also selected greater or smaller, which depends on the concrete case of application. The movement characteristics may be for example:

position of the fingertip relative to the reference surface, for example of an input surface of a touch-sensitive display; the position may be indicated by the X, Y, and/or Z coordinate relative to the input surface;
orientation of the finger or the hand relative to the movement space;
speed of the movement of the finger;
acceleration during the movement of the finger;
and/or a combination thereof.

For determining a gesture start or a gesture end either some of these movement characteristics or a combination thereof may be used.

It may also be provided that the total movement inside the movement space is to be evaluated as a gesture. Here it is advantageous to measure the gesture start or the gesture end directly from the electric signals recognized by the sensor electrodes. As soon as there is a signal change which is indicative for a deformation of the electrical near-field, this may be interpreted as a gesture start. The same applies for the gesture end. As soon as the electric signal measured at the electrodes is representative for the fact that no deformation of the electrical near-field exists, this may be interpreted as a gesture end.

Alternatively even at the start of the gesture recognition system according to the invention a continuous gesture recognition may be started. In it the movement path is continuously analyzed. As soon as a predetermined command gesture is recognized in the movement path, the following gestures extracted from the movement path are assigned a corresponding function to be performed. I.e. gestures recognized temporally before the command gestures remain unconsidered. The same method may also come into operation for example in order to finish the gesture input with the help of a predetermined command gesture. In this respect a command gesture may be extracted from the movement path and recognized in the same way as the other gestures.

Alternatively the gesture start and/or the gesture end can also be determined by changing the electric property of the object in the movement space. For example a user may move a hand in an electric alternating field in front of a shop window. If the user at the same time with the other hand touches a grounding surface or he steps at the same time on an earthed surface before the shop window, this leads to a deformation of the lines of force of the alternating electric field, which may be recognized as a gesture start.

In another embodiment the gesture start and/or the gesture end may be also determined by the user operating a control element.

FIG. 4 shows the time course of the distance (distance in Z direction) of the fingertip from the reference surface during a movement. The distance of the fingertip from the reference surface may be used as a criterion in order to determine the beginning and the end of a gesture. For this purpose a threshold value is defined and falling below or exceeding it determines the beginning or the end of a gesture. As shown in FIG. 4, a distance of 4 cm from the reference surface is defined as threshold value. As may also be seen in FIG. 4, the fingertip continuously approaches the threshold value. As soon as the distance of the fingertip from the reference surface is smaller than 4 cm, the corresponding point $40a$ is marked in the movement path $40$ as gesture start. As soon as the distance of the fingertip from the reference surface again exceeds the threshold value of 4 cm, the corresponding point $40b$ is marked in the movement path as gesture end. The gesture is now formed by the movement path between the gesture start $40a$ and the gesture end $40b$. This movement path, as already explained above, may be fed to a pattern recognition.

Naturally, a threshold value different from that shown in FIG. 4 may be used for determining the gesture start or the gesture end by means of the distance of the fingertip from the reference surface; this in the end depends on the concrete case of application of the method according to the invention. The distance of the fingertip from the reference surface may be determined for example by means of triangulation from the deformations of the electrical near-field detected at the respective sensor electrodes.

FIG. 5 shows a second threshold value method according to the invention for determining a gesture start and a gesture end of a finger movement in a movement space. As movement characteristic the speed of the fingertip relative to the reference surface is used, in FIG. 5 being shown the time course of the speed of the finger movement in X direction.

In the example shown in FIG. 5 also the speed course of the fingertip in X direction is evaluated as a feature for the gesture start or the gesture end, wherein exceeding a predetermined speed (threshold value) defines the gesture start and falling below of the predetermined threshold value defines the gesture end. Like according to the threshold value method according to FIG. 4, also here the point $50a$ of the movement path $50$ may be assigned a gesture start mark and the point $50b$ may be assigned a gesture end mark. The movement path between gesture end and gesture start may be fed again to a pattern recognition.

The speed course may also be used to remove unintentional movements from the movement path. For this purpose for example a second threshold value may be provided, and exceeding it is an evidence that the movement is not intended, but an unintentional movement inside the movement space (e.g. trembling of the hand) or a disturbing signal (e.g. from mobile phones located near the system, fluorescent tubes, etc.). The corresponding point $51a$ of the movement path $50$ may be assigned a corresponding information, which indicates an exceeding of the second threshold value. If the movement speed falls below this second threshold value again, this point $51b$ may also be assigned a corresponding information of the movement path $50$ for the falling below of the second threshold value.

In the example shown in FIG. 5 the movement path $50$ also contains two gestures, i.e. a gesture which is formed by the movement path between the points $50a$ and $51a$ and a second gesture formed by the movement path between the points $51b$ and $50b$. According to the example shown in FIG. 5, two segments from the movement path $50$ are fed to a pattern recognition. The segment $51$, which represents an unintentionally movement, is not fed to the pattern recognition and, if necessary, it may be rejected.

Alternatively from the two segments of the movement path shown in FIG. 5 ($50a$ to $51a$ or $51b$ to $50b$) a single movement path between the points $50a$ and $50b$ can be generated again, which may be then fed to a pattern recognition. For this purpose the movement path $50$ between the points $51a$ and $51b$ may be interpolated. An interpolated segment between points $51a$ and $51b$ is shown in FIG. 5 with the reference sign $52$. For the interpolation, interpolation methods known per se may be used, for example a cubic spline interpolation. Thus unintentional movements may be efficiently compensated in a movement path, without taking by mistake in this respect two or several gestures and without freak values in the movement path having a negative influence on the following pattern recognition.

By particularly generous compensation methods also such gesture recognition systems may be realized which can recognize only a simple stock of gestures, but on the other hand are more tolerant in terms of errors in gesture recognition. Thus also gesture recognition systems for three-dimensional recognition of gestures for persons with a considerably limited motor function may be provided, e.g. because of a handicap or an illness (e.g. Parkinson).

Instead of the speed course in X direction also the speed course in Y direction and/or in Z direction may be evaluated. Alternatively also the speed course in all three directions may be considered for determining a gesture start or a gesture end. Instead of the speed course over time also the course of the acceleration over time may be used for determining the gesture start or the gesture end.

FIG. 6 shows a still further method for determining a gesture start or a gesture end in a movement path.

FIG. 6 shows the temporal lapses of the distances between a sensor electrode and the fingertip of a moving finger in a sensor system with four sensor electrodes. For example the course $60a$ corresponds to the time course of the distance of a fingertip relative to a first sensor electrode. Also here a threshold value is defined, and exceeding or falling below it determines the beginning of a gesture or the end of a gesture. According to the invention a gesture start appears when at least one of the four lapses shown in FIG. 6 falls below the preset threshold value. Therefore a gesture end may exist when all four lapses have again exceeded the corresponding threshold value.

The threshold value methods shown in FIGS. 4 to 6 may be used individually or in combination for determining a beginning of a gesture or an end of a gesture. As additional condition may also be determined that one or more of the threshold values shown in FIGS. 4 to 6 must be exceeded or fallen below over a predetermined period, so that exceeding or falling below are interpreted as a gesture start or as a gesture end. Its also conceivable that the threshold values shown in FIGS. 4 to 6 must be exceeded or fallen below in a predetermined order in order to detect a gesture start or a gesture end.

In the following, with reference to FIG. 7a a method for recognizing a gesture from a movement path which corresponds to a movement of a fingertip in the movement space 10 or in the detection space 20, is described, wherein only the X and the Y coordinates are considered. A user by means of a movement in the movement space 10 or in the detection space 20 has input the digit "2". The corresponding movement path (after the gesture start or gesture end have been recognized) is indicated in FIG. 7a with the reference sign 70. For the purpose of the gesture recognition the movement path is at first broken up in segments. For the breaking up of the movement path in single segments for example standardized hit boxes 75 (cf FIG. 8) may be used, which enclose the respective segment from the movement path for the most part. In the gesture recognition of three-dimensional gestures, i.e. in case of movements for which additionally also the Z coordinate is considered, instead of hit boxes preferably bounding boxes are used, which enclose the respective segment of the movement path for the most part.

The standardized hit boxes 75 are a predetermined number of rectangles with a predetermined width and length, wherein each rectangle is tilted by a predetermined angle. In a simple case eight hit boxes are sufficient in order to segment a movement path. Eight possible hit boxes are shown in regard to FIG. 8. The direction of the movement path is not important for segmenting, because each hit box describes two gesture segments from a set of available gesture segments, which each proceed in opposite direction.

In a first step a hit box is selected which surrounds the first segment of the movement path as completely as possible. In the case under consideration, from the hit boxes shown in FIG. 8 the hit box HB1 is selected and assigned to the corresponding segment of the movement path. This method is continued until the total movement path has been broken up in segments with the help of the hit boxes. Because of the direction of the movement path, which is known, in a next step each hit box is assigned a corresponding gesture segment from a set of available gesture segments 72. In this case the hit box HB1 is assigned, taking into account the direction of the gesture, the segment of the movement path (A). This method is repeated until each hit box is assigned a corresponding gesture segment. The result of such an assignment is indicated in FIG. 7a with the reference sign 71.

The sequence of gesture segments generated in that way is used in order to select a corresponding gesture from a set of reference gestures. For this purpose the reference gestures are described preferably each from a sequence of gesture segments. Preferably according to the invention the reference gestures are described according to a grammar for the context-free description of gestures, which is described in more detail below.

In order to increase the resolution in gesture recognition, additional hit boxes and corresponding associated gesture segments may be provided. The hit boxes themselves may also be selected smaller, which in the gesture recognition also leads to a higher resolution.

The above-described method for recognizing gestures by means of breaking up the movement path in single segments and assigning the corresponding hit boxes may also be performed in such a way, that after detecting the first hit box, this hit box is then assigned the corresponding gesture segment. This proceeding has the advantage that already after the first detected gesture segment all those reference gestures may be excluded for gesture recognition, whose first gesture segment does not correspond to the detected first gesture segment.

In specific cases, due to an already detected gesture segment, also the number of the possible above-described gesture segments may be limited, if only determined gesture segments may follow a gesture segment. This is explained by means of the example shown in FIG. 7a. Let us suppose the set of reference gestures only consists of the reference gesture 71 shown in FIG. 7a, which describes the digit 2. In this case after the first gesture segment (a) only the gesture segment (b) can be the following gesture segment. If now a user in the first gesture segment continues the movement into the movement space in such a way that it would correspond for example to the gesture segment (e), the input or the movement may be recognized as inadmissible.

In the following a grammar for context-free description of gestures is indicated, which may be used in the method according to the invention for gesture recognition, for example to describe reference gestures.

The gesture grammar is indicated in EBNF notation.

| | | |
|---|---|---|
| G | → | A S {S} [E] |
| S | → | $S_1 \mid S_2 \mid \ldots \mid S_n$ |
| $S_1$ | → | "↘" |
| $S_2$ | → | "↗" |
| ... | | |
| $S_n$ | → | "↗" |
| A | → | AM {(OP AM)} |
| AM | → | "Z < 2 cm" $\mid \ldots \mid$ "Vx > 4 cm/s" |
| E | → | EM {(OP EM)} |
| EM | → | "Z ≥ 2 cm" $\mid \ldots \mid$ "Vx ≤ 4 cm/s" |
| OP | → | "AND" $\mid$ "OR" |

This context-free gesture grammar has the following meaning:

The gesture G consists of a gesture start A followed by a gesture segment S, which may be optionally followed by several further gesture segments, optionally further followed by a gesture end E. A gesture segment S is formed from a gesture segment from the set of the gesture segments {$S_1$, $S_2$, . . . , $S_n$}. The gesture segment S1 is represented for example by the sign "↘", etc.

Thus the gesture end is optional, because continuous gestures do not always have to have a gesture end.

The gesture start is composed of an initial feature AM optionally followed by one or several sequences, which are formed by an operator OP followed by a initial feature AM. The operator in the present example may be "AND" or "OR".

One form of a beginning of a gesture would be for example "Z<2 cm AND Vx>4 cm/s".

This form defines that in case of a distance of less than 2 cm e.g. of the fingertip from the reference surface and in case of a speed of the fingertip relative to the reference surface of more than 4 cm/s, a gesture start exists in the movement path.

The gesture end E is composed of an end feature EM optionally followed by one or several sequences, which are formed by an operator OP followed by an end feature EM.

The distinction between discrete and continuous gestures may also be described by the following extension of the grammar:

| | | |
|---|---|---|
| G | → | KG \| DG |
| DG | → | A S {S} E |
| KG | → | A S {S} [E] |

Moreover this gesture grammar implies that each gesture consists of at least one gesture segment.

According to this gesture grammar all gestures may be described independently of the respective context.

So for example a gesture which represents a square, may be described by using the above-described gesture grammar for example as follows:

□=A→↑←↓E

With this grammar also special command gestures, e.g. the above mentioned starting gesture, may be described.

The use of reference gestures, which are described according to this gesture grammar, in the method according to the invention for the gesture recognition has several benefits:
- The reference gestures may be described independently of the context in which the method according to the invention is used for gesture recognition.
- The sequence of the gesture segments of a reference gesture may be also stored in a database, wherein in saving the respective reference gestures the grammar will be maintained. The reference gestures stored in the database may be indexed both in terms of the whole sequence and in terms of the single gesture segments, which particularly in regard to the methods described in FIGS. 7a and 7b for the gesture recognition entails considerable speed benefits, because the corresponding reference gestures may be determined by an indexed access to the database.
- The reference gestures may be stored in a very space-saving way, which is particularly advantageous in embedded systems which only dispose of a small storage.

FIG. 7b shows an example of an error correction method which may come into operation during the extraction or after the extraction of a gesture from a movement path. The error correction method has the advantage that a gesture can be correctly recognized even if the movement path contains segments which according to the segmentation method described in regard to FIG. 7a cannot be assigned to any gesture segment of a gesture from the set of the reference gestures.

For this purpose, as described in FIG. 7a, the movement path is broken up in segments with the help of hit boxes. Each hit box is assigned a corresponding gesture segment.

The movement path which is to correspond to the digit "2", however presents a dent between the points P1 and P2, which entails that in the movement path two hit boxes HB4a and HB4b are assigned to the gesture segment describing the dent, wherein however no reference gesture is present which comprises the corresponding gesture segment as fourth and as fifth gesture segment. A gesture recognized in this way, to which no reference gesture may be assigned, could now be rejected as a not recognized gesture. It is however desirable that such misentries can be corrected, in order to obtain a correctly recognized gesture.

In one embodiment of the invention the error correction method may be formed in such a way that at first a similarity comparison between the sequence of the recognized gesture segments and the gesture segments of the reference gestures is carried out. In doing so it is established that the first three gesture segments and the last four gesture segments of the recognized gesture segments are identical to the corresponding gesture segments of the reference gesture which is described with the digit "2". If the similarity comparison leads to only one similar reference gesture, the gesture segments assigned to the hit boxes HB4a and HB4b may be replaced with the gesture segment (d). The replacement then leads to a correctly recognized gesture.

As an alternative to the replacement of gesture segments the corresponding gesture segments may be completely removed from the recognized gesture. In a following step, between the points P1 and P2 an interpolation method may then be carried out, as it has been already described in regard to FIG. 5. The interpolated movement path between the points P1 and P2 resulting in such a way may be then subjected again to a segmentation with the help of hit boxes.

This error correction method may be used recursively, in order to for example correct still further present errors after an error correction.

In this error correction method a maximum recursion depth may also be preset, and reaching it the error correction is broken off. If after the break-off of the error correction a gesture can still not be completely recognized, the gesture may either be rejected or the user may be offered a proposal for the recognized gesture. Alternatively an error threshold may also be provided, falling below which entails that a gesture is accepted as correctly recognized. The error threshold for example may be indicated in the degree of the recognized gesture segments in reference to a reference gesture. If for example 80% of the gesture segments of a reference gesture coincide with the gesture segments of the extracted gesture, it may be assumed that the recognized gesture corresponds to the reference gesture.

FIG. 9a and FIG. 9b show two examples for a three-dimensional gesture recognition, wherein during the extraction of the gesture from the movement path each time one context information is considered.

FIG. 9a shows an input surface B, on which a confirmation button (OK button) is visualized. In the movement space (not shown in FIG. 9a), which is spanned by an electrical near-field, a detection space 20 is defined, which is assigned to the confirmation button. The movements of the fingertip of the hand H taking place in the detection space 20 are interpreted as movements belonging to the confirmation button. I.e. part of the movement path, which lies inside the detection space 20, is interpreted as movement path belonging to the detection space 20.

The confirmation button or the detection space 20 is assigned, as context information, the information that the confirmation button is a selection button, which may be operated by approaching the button with following distancing from the button. On the basis of this context information the gesture recognition can be substantially limited to evaluating the movement path only regarding the Z direction. From the result of this evaluation may then be concluded, if the confirmation button has been operated or not. If the confirmation button has been operated, a signal may be provided which is indicative for the confirmation.

The X or the Y direction of the movement path need only be evaluated in order to verify if the fingertip has left the detection space 20 in lateral direction. If the fingertip has left the detection space 20 only for a very short time in lateral direction and afterward returns to the detection space 20, this may be interpreted as unintentional leaving the detection space 20. Between the places where the movement path abandons the detection space 20 or enters again the detection space 20, the movement path may be interpolated regarding the Z direction, as it has been shown for example in regard to FIG. 5. If the fingertip abandons the detection space 20 for rather a long time in lateral direction, this may be interpreted also as an intended break-off of the gesture by the user.

FIG. 9b shows an input surface B with a slide control, which may be shifted in X direction to the left or to the right. The slide control is assigned a detection space 20. The detection space 20 or the slide control is assigned a context information, which indicates that it is a slide control, which may be moved only in X direction. On the basis of this context information the gesture recognition may be limited on evaluating only the X coordinates of the movement path inside the detection space 20. In the slide control shown it is advantageous to continuously evaluate the X coordinate of the movement path. In this way the movement of the slide control may be synchronized with the movement of the fingertip, so that the user obtains a direct feedback on its movement.

Also here a short-term leaving of the fingertip from the detection space 20 in Y direction or in Z direction may be interpreted as an unwanted leaving from the detection space 20, as long as the return in the detection space 20 is done within a predetermined period. If the fingertip does not enter the detection space 20 within this predetermined period, leaving the detection space 20 may be interpreted as a break-off of the input. The slide control may then return into its original position. Instead of a slide control for example a rotary knob may be provided, which may be moved by a circular movement of the fingertip.

On the input surface B further input elements may be indicated, for example selection fields (check buttons) or selection lists (combo boxes), which for example are opened by an approach and by which in the open state one can navigate by means of a corresponding movement. All input elements may be displayed individually or in combination on a input surface B. Each input element is assigned a corresponding detection space 20. Each input element or each detection space 20 may also be assigned a corresponding context information which indicates how a corresponding movement path is to be evaluated or which gestures inside the respective detection space 20 are admissible. Besides the mentioned input elements at the input surface B also input fields for inputting signs (e.g. letters or digits) may be provided, as has been already described with regard to FIG. 7.

FIG. 10 shows by way of example, how a movement or a movement path inside the movement space and/or inside a recognition space may be evaluated, when the movement of the finger in Z direction is not relevant for the gesture to be evaluated. In that case it is thus in the end a two-dimensional gesture, so that the evaluation of the movement path may be reduced to a two-dimensional evaluation. The reduction of the three-dimensional movement path to a two-dimensional movement path substantially corresponds to the projection of the movement path on the X-/Y-planes. On the reduced movement path a two-dimensional gesture evaluation may be then carried out, as described for example in regard to FIG. 7. In this way for example also in case of three-dimensional gestures or in case of three-dimensional movements inside the movement space, in case of which e.g. the movement in Z direction is not relevant for the evaluation, a three-dimensional evaluation may be reduced to a two-dimensional evaluation, which entails a minor need of computing power for the gesture recognition. This can be particularly important for mobile terminals, which only dispose of little computing power.

FIG. 11 shows an example of a gesture which is extracted from two different movement paths (two finger gestures). In the movement space a first movement with the forefinger of the hand H1 is carried out. With the forefinger of the second hand H2 a second movement is carried out in the movement space. From both movements each time a first movement path BP1 and another movement path BP2 are generated. From each of the two movement paths a gesture is then extracted, which may be interpreted as partial gestures of a composed gesture. If in the extraction of the partial gestures or in the recognizing of the partial gestures the Z coordinate is not taken in consideration, each of both partial gestures represents a segment of a circle, as appears in FIG. 11. The total gestures resulting from the two partial gestures correspond thus to a circle. If two partial gestures are components of a composed gesture or not, this for example can be made dependent of the distance of the gesture start of a first gesture from the gesture end of the second gesture. If the distance is below a predefined threshold, the partial gestures compose a total gesture. If the value does not fall below the threshold, the two partial gestures are interpreted as separated gestures.

FIG. 12a to FIG. 12c show a selection of a gesture inventory with a number of one-finger gestures and two-finger gestures. In an embodiment of the invention the letters or digits shown in FIGS. 12b and 12c may be recognized in a way non-dependent of the movement direction. For example the character "V" may be input from top left to top right or also from top right to top left.

FIG. 12d shows a selection of a gesture inventory with a number of hand gestures. Such hand gestures for example may be provided when only very few movements in the movement space have to be considered.

The invention claimed is:

1. A method for the contactless detection and recognition of gestures in a three-dimensional movement space, wherein the gesture comprises an unintentional movement, the method comprising the steps of:
   generating an electrical near-field, which defines the three-dimensional movement space;
   moving an object in the three-dimensional movement space in a contactless fashion, wherein a movement of the object comprises an unintentional movement,
   detecting deformations of the electrical near-field caused by the movements of the object in the three-dimensional movement space by a plurality of sensors providing a plurality of sensor signals,
   generating from the detected deformations of the electrical near-field at least one movement path corresponding to the movement of the object in the three-dimensional movement space,
   during the generation of the movement path in the movement path determining a gesture start, wherein beginning with the gesture start the gesture is extracted from the movement path, wherein a gesture start is detected when one or more measured variables exceed one or more respective predefined thresholds, after detecting the gesture start, feeding the movement path starting at the gesture start and ending at a gesture end to a pattern recognition, wherein at least one segment of the movement path identified as an unintentional movement is replaced by an interpolation, wherein the unintentional movement is determined when the movement path exceeds a second predetermined threshold and wherein the interpolation is a cubic spline interpolation and starts at a start of the at least one segment and ends at an end of the at least one segment.

2. The method according to claim 1, wherein the generation of the at least one movement path considers an object property of the object, wherein the object property is derived from the deformations of the electrical near-field.

3. The method according to claim 2, wherein by the derivation of the object property an advance information is considered that is provided for the step for the generation of the movement path.

4. The method according to claim 2, wherein the object property includes at least one of the group comprising form of the object, size of the object, number of objects, orientation of the object relative to a reference surface, electric material property, or a combination thereof.

5. The method according to claim 1, wherein in the generation of the movement path only such deformations of the electrical near-field are considered that fulfill at least one predetermined deformation criterion comprising at least one of the group comprising the distance of the object causing the deformation relative to the reference surface, the absolute or relative field variation, the first or second derivation of the field variation according to the time, and a combination thereof.

6. The method according to claim 1, wherein each point of the movement path is assigned a number of movement properties, wherein the movement property comprises at least one of the group of position of the object relative to the reference surface; orientation of the object relative to the three-dimensional movement space; speed of the object; acceleration of the object; and a combination thereof.

7. The method according to claim 6, wherein the gesture start or the gesture end are determined by comparisons of at least one movement property with at least one threshold value, wherein the exceeding/falling below of the threshold value is indicative for the gesture start or for the gesture end.

8. The method according to claim 7, wherein the exceeding/falling below of the threshold value is indicative for the gesture start or for the gesture end if the threshold value is exceeded/fallen below for a predetermined duration.

9. The method according to claim 7, wherein in case of several movement properties the exceeding/falling below of the respective threshold values is indicative for the gesture start or for the gesture end if the respective threshold values are exceeded/fallen below in a predetermined order.

10. The method according to claim 1, wherein the step for the extraction of the gesture is assigned a context information.

11. The method according to claim 10, wherein the context information includes a first context information which indicates that a discrete extraction is to be used, and a second context information which indicates that a continuous extraction is to be used.

12. The method according to claim 11, wherein in an assigned first context information during the generation of the movement path in the movement path a gesture end is determined.

13. The method according to claim 10, wherein the context information includes a third context information which includes a set of reference gestures, wherein the set of reference gestures indicates which gestures may be detected, wherein the reference gestures are preferably described according to a gesture grammar.

14. The method according to claim 1, wherein the generation of the movement path is adapted to generate, in a movement of a hand with one or several distinguishable fingers in the three-dimensional movement space, one or several movement paths corresponding to the fingertips of the one finger or the several distinguishable fingers.

15. The method according to claim 1, wherein a composed gesture is formed by several gestures extracted from several movement paths.

16. A context-free grammar for the description of gestures for the use in a method according to claim 1.

17. The method according to claim 1, wherein selection of the discrete or continuous extraction depends on a context information, wherein the context information depends on an application in which the method is used.

18. The method according to claim 1, wherein a gesture end is detected if the speed of the movement path falls below the predefined threshold.

19. The method according to claim 1, wherein the extraction of at least one gesture from the movement path includes an extraction of a discrete gesture and an extraction of a continuous gesture.

20. The method according to claim 19, wherein a discrete gesture is completely fed to the pattern recognition as soon as the gesture end of the gesture has been determined.

21. The method according to claim 1, wherein the extraction of a gesture includes a pattern recognition for recognizing the extracted gesture.

22. The method according to claim 21, wherein the continuously fed gesture is continuously compared by the pattern recognition with partial gestures of reference gestures, in order to detect from the reference gestures those reference gestures corresponding to the continuously fed gesture.

23. The method according to claim 21, wherein the pattern recognition breaks up the gesture into gesture segments and compares the gesture segments with gesture segments of reference gestures.

24. The method according to claim 1, wherein the variables are selectable from a distance of the object to the surface, the speed of the movement path, and the acceleration during the movement of the object.

25. A system for the contactless detection and recognition of gestures in a three-dimensional movement space, comprising an electrical near-field generator which defines the three-dimensional movement space and comprises at least one transmitting electrode, at which an alternating electrical field is emitted, and at least one signal generator, which is coupled with the at least one transmitting electrode, for charging the at least one transmitting electrode with an electric alternating signal, an electric near field detector for detecting deformations of the electrical near-field caused by movements of at least one object in the three-dimensional movement space;

an analyzing unit for generating from the detected deformations of the electrical near-field a movement path corresponding to the movement of the object; and wherein the analyzing unit is configured to detect a gesture start and optionally a gesture end in the movement path while the movement path is being generated, wherein the analyzing unit is configured to detect a gesture start when one or more measured variables exceed respective predefined thresholds; and if a continuous extraction is to be performed:

to continuously extract the gesture from the movement path beginning with the gesture start and to continuously generate output values wherein the continuously generated output values are used to display information on a display device such that the displayed information is substantially synchronous with the movement of the object;

and if a discrete extraction is to be performed:

to forward the movement path received between a gesture start and the gesture end to a pattern recognition system, wherein at least one segment of the movement path identified as an unintentional movement is replaced by an interpolation, wherein the unintentional movement is determined when the movement path exceeds a second predetermined threshold and wherein the interpolation is a cubic spline interpolation and starts at a start of the at least one segment and ends at an end of the at least one segment.

26. The system according to claim 25, wherein the electric near field detector comprises at least one reception electrode and an evaluating device coupled therewith for detecting a change of the frequency, the amplitude or the phase of an alternating electric field coupled into the reception electrode or an alternating electric field emitted at the reception electrode.

27. The system according to claim 26, wherein the frequency, the amplitude, or the phase of the alternating signal are adjustable.

28. The system according to claim 25, wherein selection of the discrete or continuous extraction depends on a context information, wherein the context information depends on an application in which the method is used.

29. The system according to claim 25, wherein the variables are selectable from a distance of the object to the surface, the speed of the movement path, and the acceleration during the movement of the object.

30. A method for the contactless detection and recognition of gestures in a three-dimensional movement space, the method comprising the steps of:

generating an electrical near-field, which defines the three-dimensional movement space;

moving an object in the three-dimensional movement space, detecting deformations of the electrical near-field caused by the movements of the object in the three-dimensional movement space by a plurality of sensors providing a plurality of sensor signals, generating from the detected deformations of the electrical near-field at least one movement path corresponding to the movement of the object in the three-dimensional movement space, during the generation of the movement path in the movement path determining a gesture start, wherein beginning with the gesture start the gesture is extracted from the movement path, wherein a gesture start is detected if one or more measured variables exceed respective predefined thresholds, wherein the extraction of at least one gesture from the movement path includes a discrete and a continuous extraction of a gesture and wherein for a discrete extraction, the gesture is completely fed to a pattern recognition as soon as a gesture end of the gesture has been determined, and for the continuous extraction, after the detection of the gesture start the movement path is continuously evaluated and output values are generated continuously wherein the continuously generated output values are used to display information on a display device such that the displayed information is substantially synchronous with the movement of the object, wherein at least one segment of the movement path identified as an unintentional movement is replaced by an interpolation, wherein the unintentional movement is determined when the movement path exceeds a second predetermined threshold and wherein the interpolation is a cubic spline interpolation and starts at a start of the at least one segment and ends at an end of the at least one segment.

31. The system according to claim 30, wherein the analyzing unit is configured to detect a gesture end if the one or more measured variables fall below the respective predefined thresholds.

32. The method according to claim 30, wherein the variables are selectable from a distance of the object to the surface, the speed of the movement path, and the acceleration during the movement of the object.

33. A system for the contactless detection and recognition of gestures in a three-dimensional movement space, wherein the gesture comprises an unintentional movement, comprising an electrical near-field generator which defines the three-dimensional movement space and comprises at least one transmitting electrode, at which an alternating electrical field is emitted, and at least one signal generator, which is coupled with the at least one transmitting electrode, for charging the at least one transmitting electrode with an electric alternating signal, an electric near field detector for detecting deformations of the electrical near-field caused by movements of at least one object in the three-dimensional movement space;

an analyzing unit for generating from the detected deformations of the electrical near-field a movement path corresponding to the movement of the object; and wherein the analyzing unit is configured to detect a gesture start and a gesture end in the movement path while the movement path is being generated, wherein the analyzing unit is configured to detect a gesture start if one or more measured variables exceed one or more respective predefined thresholds, and after detecting the gesture start, to feed the movement path starting at the gesture start and ending at a gesture end to a pattern recognition system, wherein at least one segment of the movement path identified as an unintentional movement is replaced by an interpolation, wherein the unintentional movement is determined when the movement path exceeds a second predetermined threshold and wherein the interpolation is a cubic spline interpolation and starts at a start of the at least one segment and ends at an end of the at least one segment.

* * * * *